United States Patent [19]
Weinblatt

[11] Patent Number: 5,515,270
[45] Date of Patent: May 7, 1996

[54] TECHNIQUE FOR CORRELATING PURCHASING BEHAVIOR OF A CONSUMER TO ADVERTISEMENTS

[76] Inventor: Lee S. Weinblatt, 797 Winthrop Rd., Teaneck, N.J. 07666

[21] Appl. No.: 372,075

[22] Filed: Jan. 12, 1995

Related U.S. Application Data

[63] Continuation of Ser. No. 733,763, Jul. 22, 1991, Pat. No. 5,401,946.

[51] Int. Cl.$^6$ ..................... G07G 1/12
[52] U.S. Cl. ............. 364/405; 235/375; 348/1
[58] Field of Search ................ 235/375, 383; 364/401, 405; 348/1; 455/2

[56] References Cited

U.S. PATENT DOCUMENTS

| | | |
|---|---|---|
| 4,331,973 | 5/1982 | Eskin et al. . |
| 4,659,314 | 4/1987 | Weinblatt . |
| 4,695,879 | 9/1987 | Weinblatt . |
| 4,718,106 | 1/1988 | Weinblatt . |
| 4,833,308 | 5/1989 | Humble . |
| 4,872,113 | 10/1989 | Dinerstein . |
| 4,882,675 | 11/1989 | Nichtberger et al. . |
| 4,949,256 | 8/1990 | Humble . |
| 5,056,019 | 10/1991 | Schultz et al. ............ 364/405 |
| 5,128,752 | 7/1992 | Von Kohorn ............ 364/405 |

FOREIGN PATENT DOCUMENTS

| | | |
|---|---|---|
| 0144085A3 | 6/1985 | European Pat. Off. . |
| 0189691A1 | 8/1986 | European Pat. Off. . |
| 0263635A3 | 4/1988 | European Pat. Off. . |
| 58-58670 | 4/1983 | Japan . |
| 1-199292 | 8/1989 | Japan .................. 235/449 |
| WO 85/04543 | 10/1985 | WIPO . |

OTHER PUBLICATIONS

"Magnetic Media Receipt Function", Apr. 1990, IBM Technical Disclosure Bulletin, pp. 373–374, vol. 32, No. 11.

Primary Examiner—F. L. Evans
Attorney, Agent, or Firm—Frishauf, Holtz, Goodman, Langer & Chick

[57] ABSTRACT

Advertisements and promotions to which a consumer has been exposed are monitored together with the subsequent purchasing behavior of that consumer. The information is combined to analyze whether and to what extent the advertisements and/or promotions influenced the consumer's purchases. Purchases are monitored by producing a machine readable record thereof with a store cash register. The consumer inserts this record into a home unit which stores this information. The home unit is also capable of issuing a reward to the consumer for cooperating. Also, the advertising, promotion and/or purchase data is classified by the home unit into selected categories which can be accessed by a computer for further processing to provide, for example, certain test results of interest relatively quickly because only a portion of all the collected data needs to be analyzed.

6 Claims, 3 Drawing Sheets

TECHNIQUE FOR CORRELATING PURCHASING BEHAVIOR OF A CONSUMER TO ADVERTISEMENTS

This is a continuation of application Ser. No. 07/733,763 filed Jul. 22, 1991, now U.S. Pat. No. 5,401,946.

BACKGROUND OF THE INVENTION

This invention is directed to a technique which monitors the advertisements and promotions to which consumers selected as test subjects are exposed as well as the subsequent purchases made by those consumers and, in particular, to an improved technique for collecting more data than has previously been feasible, and to correlate the purchases with the advertising and promotions.

Expenditures on advertising (e.g. television commercials) and promotion (e.g. coupons) of consumer products in the U.S. exceeded $110 billion for the year 1990. Advertisers who spend such huge sums of money understandably want to determine whether the money is being well spent and, if not, how improvements can be made.

Factors which affect the cost of an advertising and/or promotion campaign include (1) the extent of geographic coverage, (2) the advertising medium (e.g. print, radio, television), (3) how many advertising media are used, (4) frequency of use for the advertisement and/or promotion, (5) the time slot, and (6) the time duration of the campaign. When an advertising campaign is launched, these factors are decided upon based on various considerations of importance to a particular advertiser and which need not be delved into here. However, with the initial decisions having been made, the advertiser must have feedback to assess whether the campaign is working. A change in total sales is not enough because that could be happening regardless of, or perhaps even in spite of, the campaign rather than because of it. What the advertiser must know is (a) was a targeted portion of the public exposed to the campaign as planned, and (b) did the consumers who were exposed to the campaign purchase the product or services covered by it.

Various techniques are currently available to provide information of this nature. However, each of these suffers from various drawbacks. The first, and most primitive, involves an interview conducted by phone or, for example, at a shopping center. During such interview the consumer is asked to recall exposure to a particular advertisement and to disclose the subsequent purchases that were made. Results obtained with this technique are suspect because of the heavy reliance on memory, and a person's inclination to be biased, perhaps even subconsciously, in favor of what is of interest to the interviewer which then tends to color the consumer's responses to the interviewer's questions.

A second known approach involves recording the television programming, including commercials of course, watched in a particular household. This information is stored in an electronic memory. Consumer purchase behavior is recorded by the use of a bar code reading apparatus, such as a wand, which is passed over each purchased product when it is brought home. Information available with this technique is of limited value because it is usable only with products bearing a bar code. A great number of products are not sold with a bar code, such as gasoline, pharmaceuticals, major appliances, clothing and unpackaged food items. Moreover, the purchase of services, such as is provided by airlines, movie houses and theaters, certainly cannot be monitored. Also, a great deal of effort by the consumer is required to scan each and every purchased item individually. Since the scanning must be done when the consumer returns home and before the purchases are stored away, the person is already tired and/or eager to get started on other tasks and, therefore, may not perform the scanning. Such failure to carry out the recording of purchases part of this monitoring approach is even more likely for perishable items such as ice cream which need to be refrigerated or kept frozen almost immediately upon the consumer's return home. Consequently, consumer cooperation with this technique is also suspect in addition to being of limited value due to total reliance on only bar-coded items.

A third technique involves a particular store that has been equipped with special computer equipment to identify certain consumers and to record their purchases. Identification of the consumer is accomplished with a card given to the consumer and on which a unique code has been recorded. When the consumer arrives at the cash register, the card is handed to the cashier who uses it to enter the code. As the purchases are "rung-up" on the cash register, they are also recorded as having been made by the consumer whose identity is established by the code on the card. This purchasing behavior is stored in the special computer, and the information is periodically downloaded to a computing center. That computing center also receives information on the television commercials to which the same consumer was exposed, and collected in the same way as described above for the second technique. No media other than television are provided for. Thus, it is possible to correlate the purchases made with television commercials. However, this approach requires installation of relatively expensive computer equipment in a store, and only a very few stores can, therefore, be involved in the monitoring effort. Consequently, purchases made elsewhere by the consumer go unrecorded. As a result, the amount of information collected may provide less than a meaningful sample.

In addition to the necessity for the advertiser to have the above-discussed advertising and purchase information, it is also valuable to collect, store and analyze related information as well. For example, many products are sold with promotions such as coupons, special sizes, product combination, sale price, etc. With such information, the advertiser can determine whether the product was likely to have been sold due to the advertisement or due to the promotion, or perhaps due to both. None of the above-described techniques is capable of collecting and storing such information. The terms "advertisement" and "advertising" when used hereinafter should also be understood in context as referring to promotions as well as radio, television and print advertising.

Consumers have been given rewards as a part of known monitoring techniques to improve the likelihood of obtaining an acceptable degree of cooperation from the consumer. Although the consumers who have been selected as test subjects may intend to cooperate, many things compete for time and attention with what the consumer is asked to do so that purchasing behavior can be monitored. Consequently, despite all the best intentions, the level of cooperation is likely to drop. Rewards are designed to counter this. With the second known technique discussed above, for example, once all the information on a consumer's advertising monitoring and purchase behavior has been processed by computer, certain rewards will be sent by mail. However, this can take several weeks due to the magnitude of data that must be processed. The impact of the reward diminishes with the amount of time which elapses from the doing of the reward earning activity until the reward is received. Thus, it would be helpful to speed up the process considerably. Also, the value of the reward to the consumer could be enhanced if it were targeted better. The targeting involves customizing the reward to the purchases that are made and/or the consumer who makes them. For example, if the consumer buys clothing, then the reward could be a dry-cleaning coupon. Likewise, if the particular consumer is a female, the coupon might be for a suitable accessory to the clothing, such as a scarf, perhaps even in the same store as the one where the clothing was purchased. The possibilities are endless. However, the prior art has not provided any way for speeding up the process of providing the reward and targeting the reward in order to gain the very considerable benefit of obtaining increased consumer cooperation.

One further shortcoming of the prior art is the inability to monitor whether direct mail advertising has been read or simply discarded. Direct mail constitutes about 20% of all advertising in terms of outlay. It would be highly useful for advertisers to know whether and how the consumer's purchasing behavior is affected by direct mail advertising.

The term "exposed" when it appears throughout this specification is used in the sense of locating the consumer who is a participant in the test in such close proximity to the advertisement that the probability of the advertisement having a mental impact is high. This requires that, for example, a radio advertisement monitoring system provide not only information about when the advertisement was broadcast or even that the consumer was in the same house as the radio set when the commercial was broadcast, but that the consumer was within a relatively small distance of the radio set at that time. The same relatively stringent requirements are applied to television commercial monitoring and print ad monitoring before it can be said that the consumer has been "exposed" to it.

SUMMARY OF THE INVENTION

One object of the present invention is to increase the size of the data sample, at relatively low cost, for correlating purchasing behavior with exposure to advertising.

Another object of the present invention is to improve the reliability of such information.

A further object of the present invention is to determine the impact of promotions on consumer purchasing behavior.

Yet another object of the present invention is to speed up the process of rewarding the consumer for cooperating with the monitoring of purchasing behavior and monitoring of advertising.

One other object of the present invention is to target the rewards based on actual purchases made by the consumer to enhance the value to the consumer.

Still another object of the present invention is to provide a technique for monitoring the impact of direct mail advertising on the consumer.

It is also an object of the present invention to aid advertisers in assessing the level of interaction between different forms of advertising for determining the best combination of scheduling, relative spending in each of the advertising media, and the order of presentation as to which medium should be advertised in first, second, etc.

Another object of the present invention is to provide meaningful results very soon after the purchasing data is recorded by the consumer.

It is a further object of the present invention to increase the number of consumers in the test sample and yet still be able to provide meaningful results very soon after the purchasing data is recorded by the consumer.

These and other objects of the present invention are attained by one aspect of the present invention which is directed to an apparatus for obtaining and storing information on the purchasing behavior of a consumer as well as advertisements to which the consumer has been exposed. An advertisement monitoring means is provided for monitoring exposure of the consumer to advertisements. A cash register means located in a store places purchase information on a machine-readable record. A unit is used in the consumer's home, and it includes means for reading the machine-readable record, and means for storing output signals from the advertisement monitoring means and the reading means.

Another aspect of the present invention is directed to a method for obtaining and storing information on the purchasing behavior of a consumer as well as advertisements to which the consumer has been exposed, comprising the steps of monitoring exposure of the consumer to advertisements, and producing in a store a machine-readable record on which has been placed purchase information on purchases made by the consumer in such store. The machine-readable record is read by a unit located in the home of the consumer, and signals that are obtained from the advertisement monitoring step and the reading step are stored.

Still another aspect of the present invention is directed to an apparatus for monitoring the purchasing behavior of a consumer. A store terminal produce is a portable, machine-readable record of purchases made by the consumer. A home unit is adapted for use in the consumer's house, and it includes means for reading the machine-readable record and inputting signals therefrom into a means for storing data.

One other aspect of the present invention is directed to a method for monitoring the purchasing behavior of a consumer, comprising the steps of producing at a store a portable, machine-readable record of purchases made in such store by the consumer, and reading the record at the consumer's home. Signals generated by the reading step are stored into a signal storage apparatus.

Yet another aspect of the present invention is directed to a method for monitoring purchases made by a consumer of products and/or services, comprising the steps of providing a portable, machine readable record associated with such products and/or services at a site where such products and/or services are obtained by the consumer. The record is read by a unit located in the consumer's home, and signals generated therefrom are stored into a signal storage apparatus.

The present invention also has an aspect directed to an apparatus for monitoring the purchasing behavior of a consumer, comprising a home unit which is adapted to be located in a home of the consumer and having means for storing data associated with purchases made by the consumer. The home unit includes means for detecting when a predetermined threshold has been reached of selected data inputted into the data storing means, and means coupled to the detecting means for issuing a reward to the consumer when the threshold is reached.

A further aspect of the present invention is directed to an apparatus for monitoring the purchasing behavior of a consumer, comprising a home unit which is adapted to be located in the consumer's home, and having means for storing data associated with purchases made by the consumer. The home unit includes means for arranging data stored in the data storing means into selected categories, and means for retrieving the data in the selected categories in response to a given trigger signal.

Another aspect of the present invention is directed to an apparatus for monitoring the purchasing behavior of a consumer, comprising a recording means to produce a portable, machine-readable record of purchases made by the consumer in a store. The output of the recording means is used to place on the machine-readable record information on promotions that are available in the store which are associated with the purchases made by the consumer.

DETAILED DESCRIPTION OF THE PREFERRED EMBODIMENTS

Figure 1:
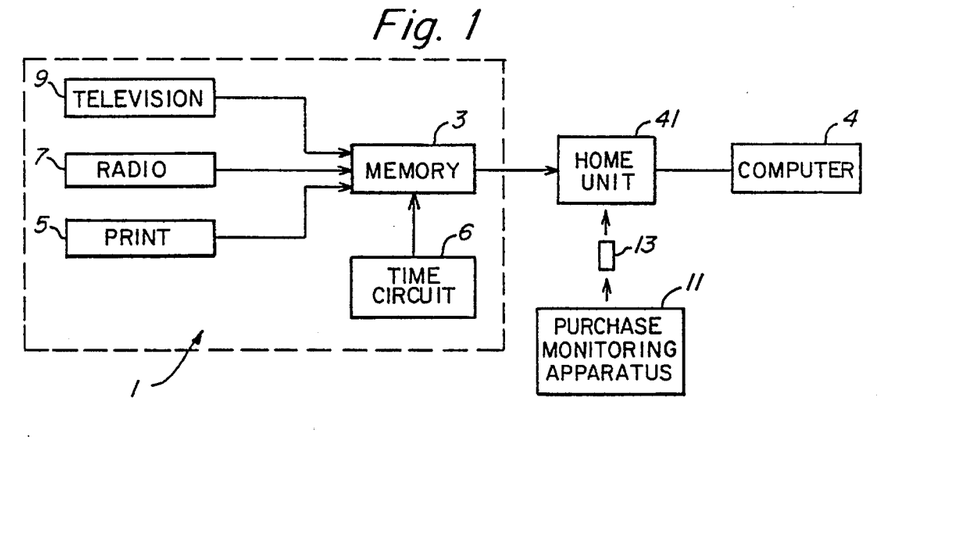
FIG. 1 is a block diagram of an apparatus arranged in accordance with the invention for monitoring the advertisements to which a consumer is exposed and the subsequent consumer purchasing behavior.

Monitoring of the exposure to advertisements by consumers has been done for quite some time, and is well known. A number of techniques have been utilized for the print, radio and television media. Any of those techniques can be used for the present invention, as long as the results are stored in advertising monitoring memory 3 of advertising monitoring apparatus 1. However, in order to minimize the inconvenience to the consumer and maximize the reliability of the data, the following particular techniques for monitoring each of these three media are preferred.

It is desirable to monitor the exposure of a consumer who has been selected as a test subject under realistic rather than artificial conditions. Consequently, the testing environment is not that of a test laboratory but, rather, any location to which the consumer is likely to go during a regular day. This includes, of course, the home and other similarly common and normal sites for one's daily activities. Otherwise, it is felt that the test results may be skewed due to the artificial conditions to which the consumer would be subjected. It is also preferable to minimize contact of the consumer with testing personnel, and this is done by automating the monitoring process.

In order to automate monitoring of the consumer on his daily routine, it is necessary to provide him/her with an apparatus that can do the requisite monitoring while not restricting his/her movement or being so obtrusive as to somehow affect the testing. This is particularly so with respect to any apparatus which monitors exposure to radio advertisements and print ads which are likely to occur away from the house in contrast to television exposure which is most likely to occur in the house. Thus, the apparatus for monitoring the radio and print media is preferably portable and is such as to be conveniently worn on the person of the consumer. For television commercials, on the other hand, it is less important because an apparatus could effectively be used which is installed in the home.

FIG. 1 depicts an advertising monitoring system 1 for monitoring consumer exposure to the various types of advertisements, including print, radio and television media. The monitoring results are stored in memory 3 to be later combined in home unit 41 with information obtained from a purchase monitoring apparatus 11 for processing and analysis by computer 4. Thus, data collected from monitoring system 1 is ultimately input to computer 4 along with data collected by purchase monitoring apparatus 11. Computer 4 then produces an output showing the relationship of the monitored consumer exposure to advertisements with respect to the purchased items. Computer 4 can be programmed in a conventional, well known manner to output this relationship in any desired form, such as tabulated or graphical.

Turning now with more specificity to the detailed configuration of monitoring system 1, it includes apparatus 7 for measuring the exposure of a consumer test subject to radio advertisements. Such an apparatus is disclosed in U.S. Pat. No. 4,718,106 issued Jan. 5, 1988 to the present inventor. That patent is hereby incorporated by reference. Briefly, this patent discloses an apparatus that can be incorporated into a wristwatch. It includes a microphone for picking up audible signals from a radio set. A particular survey code signal is periodically transmitted by the radio station and subsequently audibly reproduced by the radio set to be picked up by the microphone. The microphone outputs a resulting signal to a detection circuit which has been preset to produce an output signal only when the particular survey code signal is detected. Such an "event" is stored in an electronic memory together with the associated time. The microphone and its associated circuitry have a sensitivity set such that the survey code signal will be detected and processed only if the consumer is within a relatively short distance from the radio. Thus, it is possible to determine when (i.e. from the recorded time) the consumer was listening to that particular radio station (ie. from the recordal of an "event" based on a signal transmitted only by that station). By combining this knowledge with the time during which a particular advertisement was being broadcast by the radio station, it is possible to determine that the consumer was "exposed" to it.

The television commercial monitoring apparatus 9 can be implemented as disclosed in U.S. Pat. 4,695,879 issued Sept. 22, 1987 to the same inventor. That patent is hereby incorporated by reference. Briefly, it discloses an apparatus coupled to the television tuner which keeps a record of the channels being viewed throughout the day. A detector is worn by the viewer on the head and includes a receiver responsive to signals emitted from a transmitter installed near or on the television set. The receiver is directional so that it responds only when the head of the viewer is aimed substantially toward the television set. When the receiver detects a signal from the transmitter, it in turn emits its identification code to circuitry which records the event, and that can also be located on the television set. Thus, the event of having the viewer aiming his head at a television set at any particular time is combined with information on what channel is being viewed at the same time to provide an indication of exposure of the viewer to that particular channel. If it is known what advertisement was being broadcast at that particular time on that particular channel, it can be determined that the viewer was "exposed" to it by virtue of having his head aimed at the television set.

In addition to use of U.S. Pat. No. 4,695,879 to monitor television commercials to which the consumer has been exposed, U.S. Pat. No. 4,718,106 mentioned above can, of course, also be used for this purpose by adapting it to television use rather than radio. In particular, the consumer/ viewer test subject can be provided with circuitry incorporated, for example into a wristwatch. That circuitry would include a detector responsive to a code signal transmitted by the television station, for example, and in response only thereto a signal source in the television set would be activated. The resulting emitted signal from the signal source is detected by circuitry in the wristwatch and recorded as an "event" along with the time at which it occurred and it indicates "exposure" because the consumer was within a short distance from the set when it was tuned at that time to the channel transmitting the code signal (and therefore advertisement) of interest. All that information would be stored in memory incorporated within the wristwatch.

Print ad monitoring apparatus 5 can be implemented as disclosed in U.S. Pat. No. 4,659,314 issued Apr. 24, 1987 to the same inventor. This patent is hereby incorporated by reference. Briefly, the invention in this patent involves an insert "card" frequently found slipped into magazines. The insert card carries a switchable transmitter and a switch. When the magazine is opened, the transmitter will be automatically switched on to energize the transmitter. The resulting emitted signal is picked up by suitable circuitry as an "event" indicative of exposure of the consumer to the magazine and the ad of interest.

Monitoring system 1 is shown in the drawing as including electronic memory circuit 3 in which the information from apparatuses 5, 7 and 9 is stored. Thus, the data in circuit 3 contains measurements made in each of the radio, television and print media of the exposure by the consumer to advertisements. Circuit 3 has been depicted as a separate data storage device for the sake of convenience, clarity and ease of explanation. However, it should be understood that each of systems 5, 7 and 9 can likewise have an individual electronic memory circuit incorporated therein from which the data can be outputted to computer 4 via home unit 41. In fact, this is the case for each of the specific implementations discussed above. However it should be understood that each of those implementations was disclosed in the patent document as an individual monitoring unit. It is clearly not necessary to have individual storage devices when the three monitoring systems are combined in a single unit. Thus, for example, if the monitoring for the three advertisement media is incorporated into, for example, a wristwatch, the wristwatch will have only one electronic memory circuit 3 into which data from all the monitoring systems is stored. On the other hand, should individual monitoring systems be preferred for a particular application, each can have its own storage device. Then, as stated above, the data from each such storage device is downloaded into computer 4 without a further intervening memory circuit 3.

Monitoring system 1 is also depicted in the drawing as having a time circuit 6. As events are detected indicative of exposure by the consumer test subject to a particular advertisement, this event can be associated with a particular time that is obtained from time circuit 6. If the apparatus is incorporated into a wristwatch, the source for such a signal is readily available. Otherwise, a specialized circuit for providing a time signal is provided. It should be understood that each of systems 5, 7 and 9 can be provided with an individual time circuit, much as has been pointed out above with respect to the electronic memory circuit 3. However, a single time circuit 6 for all of monitoring system 1 has been depicted in the drawing for, again, ease and clarity of explanation.

Figure 2:
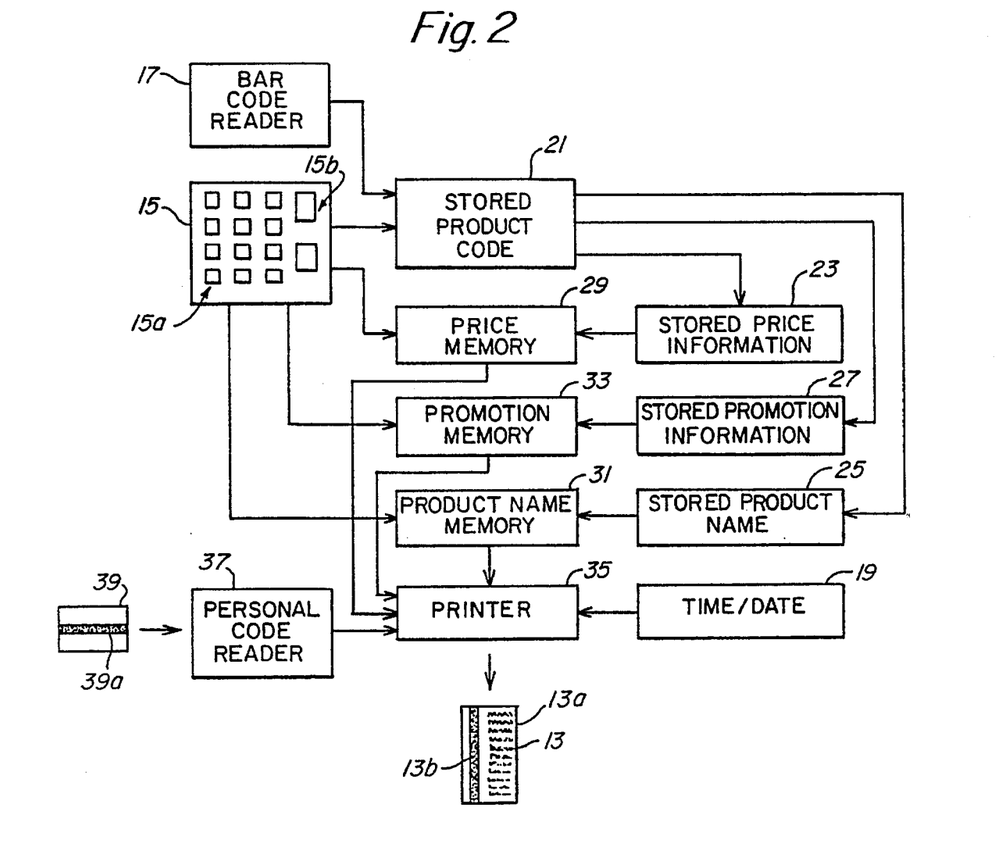
FIG. 2 is a block diagram of a cash register constructed in accordance with the invention to produce a machine-readable record of purchases made by a consumer.

Once the advertising monitoring information has been collected and stored, it is necessary to collect information on the purchasing behavior of consumers so that the exposure to advertising can be correlated with the purchasing behavior, as explained above. Accordingly, FIG. 2 depicts details of the apparatus 11 for producing a machine-readable output 13 as a record of the purchases made by a consumer. As is explained below, record 13 is taken home by the consumer where it is inserted into a reading unit. Apparatus 11 is preferably a suitably modified cash register such as is typically found in, for example, supermarkets, department stores and drug stores. It includes a keypad 15, a bar code reader 17, and a clock 19 for providing the date and time of the transaction. Keypad 15 includes alpha-numeric keys 15a and function keys 15b. Alphanumeric keys 15a can be used for entering numbers to identify the product by its assigned code, to enter price information, and the like. Bar code reader 17 can be in the form of a wand and/or a scanner which reads the bar code printed on the package. The code entered with keypad 15 and/or that which is outputted by bar code reader 17 is provided to circuit 21 which converts it into a corresponding product code. This product code is then outputted for use with memory circuit 23 which stores price information, memory circuit 25 which stores the product name, and memory circuit 27 which stores promotion information (explained in detail below). Specifically, a price for each product is stored in a suitable memory of circuit 23. When that memory is accessed by a particular code, the price corresponding to that code is outputted by circuit 23 and stored in temporary price memory 29. Similarly, the product names for the various codes are stored in a memory of circuit 25, and such memory produces the name of the product corresponding to the code which is inputted to it. This name is stored in temporary product name memory 31.

As far as circuit 27 is concerned, stores run various promotions to make the purchase of a product particularly attractive during a given period of time. Such promotions can involve coupons for lowering the price if a coupon is turned in, 2 for 1 sale, oversize containers sold for the same price, manufacturer rebates, combining one product with another product, free giveaways, eligibility for a prize drawing, etc. Such promotions are stored in a memory of circuit 27 in association with the product to which the promotion is applied. All of the products being promoted are, of course, stored in the memory of circuit 27. When a product code is entered into circuit 27, the promotion associated with it is outputted and stored in temporary promotion memory 33. FIG. 2 shows temporary memories 29, 31 and 33 connected to keypad 15 so that information to be stored therein can be entered directly from the keypad in case the necessary information has not been stored in circuits 23, 25 and 27, respectively.

Detailed information on the hardware and software used for circuits 23, 25, 27, 29, 33 and 35 is not provided herein because it is well known to anyone with ordinary skill in the art, and such details would add unnecessarily to the length of this specification.

Apparatus 11 includes a printer 35 which can be a conventional device used to print receipts. However, the output of apparatus 11 must also generate a machine-readable record which can be read by the apparatus discussed below with respect to FIG. 3. For example, FIG. 2 shows machine-readable record 13 to include printed text 13a such as is found on any conventional cash register receipt. In addition, however, machine-readable record 13 also includes a magnetic stripe 13b which includes information corresponding to text 13a, but not necessarily identical to it. Thus, text 13a would identify the product by name as well as providing the price so that the consumer can double check the charges. It would not be necessary in text 13a to list the promotion with which the product was purchased. However, such information is of interest to the advertiser so that an analysis can be made regarding the efficacy of the advertising and/or promotion campaign for the product. In addition to such information, magnetic stripe 13b can also store the personal code of the consumer who has made the purchases in question. For this purpose, apparatus 11 includes a reader 37 into which a card 39 is inserted. Card 39 is assigned to the consumer, and magnetic stripe 39a carries the consumer's unique personal code. That code is detected by reader 37 and provided to printer 35 which records it on magnetic stripe 13b. The time and date information from apparatus 19 are also recorded by printer 35 on magnetic stripe 13b.

Although printer 35 has been disclosed as providing a machine-readable output that combines text 13a with magnetic stripe 13b, a variety of other possible machine-readable records is contemplated as well. For example, two separate records can be provided, with one being the standard paper receipt and the other being a special card, perhaps even plasticized for durability. The card could have a magnetic recording surface or an integrated circuit built in. The key aim of apparatus 11 is to provide some machine-readable record that can be handed to the consumer at the conclusion of the purchase transaction to be carried home for insertion into the home unit described below with respect to FIG. 3.

It is contemplated that apparatus 11 would require minimal retrofitting of existing cash registers in order to make the technique of the present invention as widely usable as possible for as minimal a cost as possible. Thus, in an alternative embodiment, printer 35 would be two separate printers, with the standard printer that a cash register is provided with being used to produce text 13a, whereas a small, separate printer would be used to provide record 13b. Similarly, the other information utilized to advantage in the present invention, such as promotion information 27, would also be housed in a small box, perhaps even together with personal code reader 37.

One other point of interest is the fact that stored product code circuit 21 may not be necessary as a separately identifiable circuit because it can be built into circuits 23, 25 and 27. Alternatively, the conversion of the output signals from keypad 15 and bar code reader 17 by stored product code circuit 21 may not be necessary if those output signals are made compatible with the manner in which the corresponding information is stored in circuits 23, 25 and 27. Under such circumstances, the outputs of keypad 15 and bar code reader 17 could be inputted directly into circuits 23, 25 and 27. Also, temporary memories 29, 31 and 33 may not be needed. The information stored therein could also be provided directly from circuits 23, 25 and 27, respectively, to printer 35. How this can be done is well within the capability of one skilled in the art and, therefore, no additional details are deemed necessary.

Figure 3:
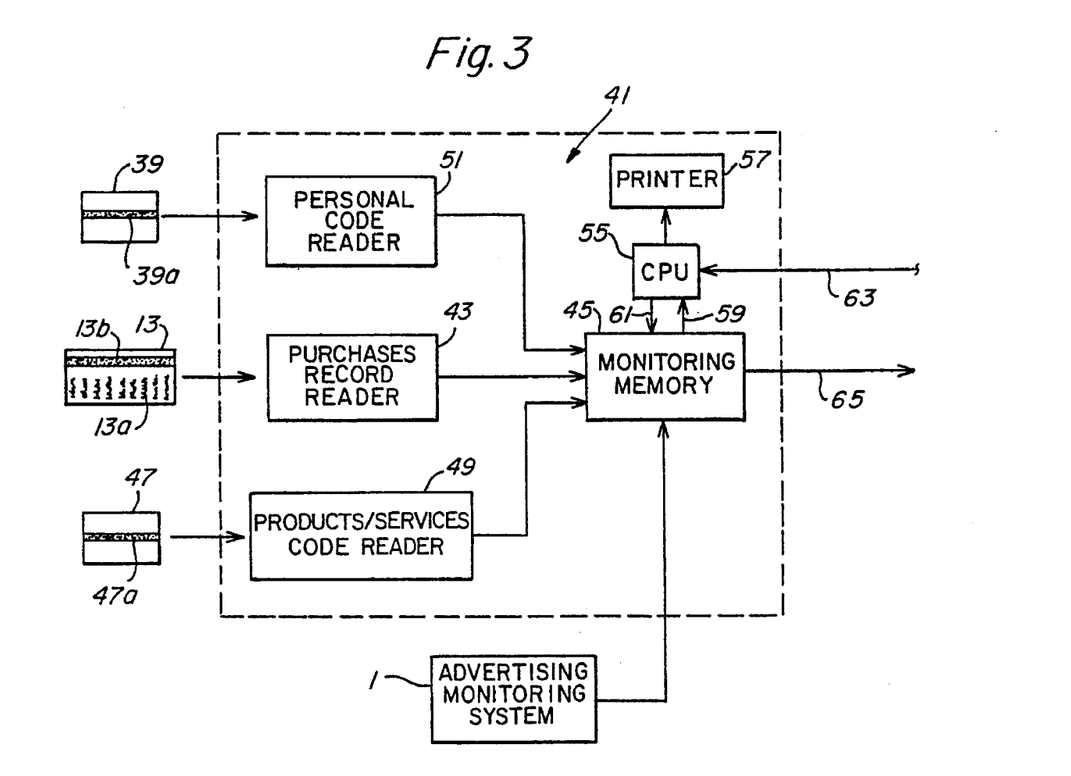
FIG. 3 is a block diagram of an apparatus designed in accordance with the invention for home use by the consumer to combine and store the monitored advertisements information and consumer purchase information to speed up the process of obtaining test results and to issue an instantaneous reward to the consumer.

When the consumer returns home with the purchased goods and the machine-readable record 13 of the purchased goods, home unit 41 depicted in FIG. 3 is made available for use therewith. Record 13 is inserted into purchases record reader 43 which is capable of reading magnetic stripe 13b. Thus, as record 13 passes through reader 43, all of the information stored on magnetic stripe 13b is detected and outputted for storage in monitoring memory 45. Monitoring memory 45 also receives the advertising monitoring information from memory 3 in advertising monitoring system 1. For example, as disclosed above, memory 3 can be incorporated into a watch with suitable ports and controls to download its memory contents into memory 45. Thus, memory 45 stores the advertising information, as obtained from memory 3, and the purchase information, as received from reader 43. That information can be downloaded to computer 4. Computer 4 could, for example, be located at a remote computing center, and the downloading would be done by telephone using conventional means. Alternatively, all of the information stored in memory 45 can be recorded on a magnetic disc, and that disc can when be sent to the computing center.

With the technique of the present invention as described up to this point, it is possible to collect a vast amount of purchasing information with minimal expenditures for specialized equipment and with only a relatively minor effort on the part of the consumer. It will be recalled that one of the above-discussed prior art techniques was of limited value because it involved the necessity of installing a significant amount of computing power in a store, and this for practical reasons could only be done in a very few stores. However, with the present invention, the cash register needs only to be modified to provide a machine-readable record, such as magnetic stripe 13b. If information on promotions is also desired, then only an additional relatively straightforward modification is also required. Consequently, the expenditures required in the stores to accommodate the technique of the present invention is minimal. Therefore, many stores can be covered by suitably retrofitting their cash registers at relatively low cost. Also, it is not necessary to install a powerful computer in the store itself, contrary to the necessity for doing so in the prior art.

It will be recalled from the discussion of the prior art presented above that a prior art technique requires separately scanning each and every one of the purchased products with a wand to detect its bar code and thereby identify the product so that it can be stored as part of the purchases record. This is a tedious activity which the consumer is apt to delay and, consequently, neglect at least in part. As a consequence, the data collected is suspect. However, with the present invention no such tedious activity is required. All the consumer needs to do is to merely insert the machine-readable record 13 into reader 43. This requires minimal time and effort and, therefore, is much more likely to be done than the tedious approach of the prior art. Moreover, the present invention readily lends itself to various incentives in order to encourage cooperation by the consumer. For example, machine-readable record 13 can carry a code which is usable to reward the consumer. Thus, if at the central computing center it is detected that a certain number of records 13 have been cooperatively read by a particular consumer, a prize can be sent to that consumer. Accordingly, the present invention significantly increases the sample size by making the collection of information possible from a large number of stores rather than, as in the prior art, from only a limited number. Moreover, cooperation by the consumer in recording the purchases for later analysis is encouraged by the speed and simplicity of the action that needs to be taken. As an additional bonus, the present invention also lends itself to providing specific monetary or other rewards for such cooperation.

It was stated above that one object of the present invention is to record the purchase of goods to which a bar code is not affixed, and also to record the purchase of services. The present invention lends itself to doing so by virtue of the fact that goods and services can be readily, inexpensively, and conveniently associated with a card 47 which carries a record of the product or service involved. Card 47 can carry, for example, a magnetic stripe 47*a* corresponding to magnetic stripe 13*b* on record 13. Thus, for example, it is known that the purchase of an automobile is not normally accompanied with a bar code. However, in accordance with the present invention it is possible to attach to the warranty, for example, a card 47. When the consumer has purchased the automobile and returns home, card 47 can be torn from the warranty and then inserted into a product code reader 49. FIG. 3 shows for the sake of convenience that the product code reader 49 is a separate device from reader 43. However, it clearly can also be one and the same reader with purchases record reader 43.

A variety of other products as well as services which normally are not associated with a bar code can similarly be associated with a card 47. For example, as far as movies are concerned, the admission ticket can be a card 47 or some such machine-readable record. Accordingly, the utilization in the present invention of a reader for detecting product purchase information carried on a portable machine-readable record lends itself to the significant advantages which accrue from providing the consumer with such a record that is readily transportable so that it can be brought home to a unit which records all of the purchasing as well as the advertising monitoring activities.

Home unit 41 also includes a personal code reader 51 similar to reader 37 in apparatus 11 of FIG. 2. This reader provides the unique code assigned to the consumer for recordal in memory 45 when it is detected from card 39. Such a signal is not required if it is already stored on machine-readable record 13. However, it may be required for associating the products and services from card 47 since that is not associated with the consumer's personal code. Each household may have several consumers as part of the test. It would not be possible to know which of them purchased the product or service represented by card 47 unless that consumer passes his/her card 39 through reader 51 in association with card 47 being passed through reader 49. Thus, it is readily apparent from the above that in addition to the already discussed advantages of the present invention, it also makes it possible to readily record and analyze purchase information which was previously unavailable for certain products and services.

Readers 43 and 49 in FIG. 3 are preferably provided with a cancellation device which, for example, punches record 13 and card 47 after each is read in order to prevent mistakenly reading the same purchase information more than once.

It was explained above that direct mail advertising constitutes a significant percentage of the total amount spent on advertising, but the advertiser is left in the dark as to whether the consumer even opened the envelope or proceeded to directly toss it away. The present invention lends itself very well to monitoring the impact of direct mail advertising on the consumer. In particular, one or both of readers 43 and 49 in home unit 41, or a separately provided reader (not shown), could be adapted to scan a specially provided code on the envelope or on literature, such as coupons, sent inside the envelope. The former approach could combine the reader with an automatic envelope opener to increase the likelihood that the contents of the envelope will be examined. The latter approach is inherently indicative of the fact that the envelope has been opened and its contents exposed to the consumer. Thus, if a coupon sent with direct mail advertising is scanned by home unit 41 and recorded in monitoring memory 45, the advertiser can determine whether that coupon was actually used by the consumer in making a purchase since the coupon code can be recorded by reader 37 in the terminal in FIG. 2. Reader 37 is provided with apparatus capable not only of reading card 39 but also coupons as well. Alternatively, a separate reader (not shown) can be provided for this purpose. The construction of such apparatus is readily apparent to one skilled in the art and, consequently, details thereof need not be provided. Thus, the advertiser can determine, on the one hand, whether the consumer was exposed to the coupon based on information recorded by home unit 41 and, on the other hand, whether the coupon had its desired effect in getting the consumer to make a purchase based on information recorded by the store terminal. If it is determined based on this technique that the coupon did not provide the necessary incentive for the consumer to purchase the particular product, then the advertiser might try increasing the value of the coupon in order to assess whether that will have the desired effect. Consequently, the present invention provides the advertiser with a very powerful tool to determine, first, whether direct mail advertising is exposed to the consumer and, secondly, whether such advertising had its desired effect and, if not, whether the desired effect can be obtained by changing the direct mail advertising campaign.

The present invention also lends itself very well to aid advertisers in assessing the level of interaction between different forms of advertising. This can be used by the advertisers for determining the best combination of scheduling, relative spending in each of the advertising media, and the order of presentation as to which medium should be advertised in first, second, etc. More specifically, a determination is initially made in some manner which need not be discussed here that the advertisements will appear at certain intervals (i.e. scheduling) in a particular advertising medium. As a second stage, the advertisement will appear in another medium together with or replacing the first medium, and so on. The relative amount of money (known by the term "weight") spent in each of these media will depend on the frequency of appearance of the advertisement, the time slot, etc. Once the campaign is run in this manner, the purchasing results will be monitored. With the purchasing results in, the advertising campaign particulars can be juggled by changing the scheduling, weight and/or the order of presentation. The purchasing results can then be compared with those obtained previously in order to ascertain whether a desirable or undesirable trend is occurring. Further refinements of the campaign can then be made.

The value of the present invention can be enhanced by providing home unit 41 with the capability of carrying out computer processing by CPU (i.e. central processing unit) 55 and a printer 57. CPU 55 is a programmable digital computer capable at least of communicating with another computer, controlling a printer, and controlling operation of an electronic memory. In fact, monitoring memory 45 can be a part of CPU 55. This type of apparatus is conventional and well known. CPU 55 is in communication with monitoring memory 45 both to receive data therefrom on line 59 and to provide instructions thereto on line 61. Of course, lines 59 and 61 can also be implemented in the form of a bus. CPU 55 is connected to printer 57 for providing data to, and controlling the operation of, printer 57. CPU 55 also receives data and control signals on line 63 from computer 4. Monitoring memory 45 provides an output on line 65 to computer 4. Lines 63 and 65 can be one and the same.

It has been explained above that one deficiency of the prior art is the time lag between an action taken by a consumer which is deserving of a reward and the actual receipt by the consumer of that reward. A span of several weeks is typical. This significantly reduces the impact of the reward on the behavior of the consumer. A maximum impact is obtained if the reward follows immediately upon the occurrence of an act carried out by the consumer. However, it has not been possible to do so with the prior art because eligibility for a reward must await the processing of a huge amount of data from all of the consumers who are participating in the test. However, the present invention provides the following solution.

CPU 55 controls monitoring memory 45 to establish certain "areas" in the monitoring memory which correspond to categories of products and/or services. Thus, for example, a particular area in monitoring memory 45 would be assigned to health related products, such as mouthwash, toothpaste, etc. Another such category would be assigned to cereals, while still another would be assigned to items of clothing. As the purchasing information is input to monitoring memory 45 from purchases record reader 43 in home unit 41, the purchase information is routed to these categories based on the code associated with each purchased item. When, for example, five items have been recorded into a particular category, this is detected by CPU 55 based on data provided to it on line 59, and CPU 55 responds by controlling printer 57 to generate a coupon as a reward to the consumer.

Figure 4:
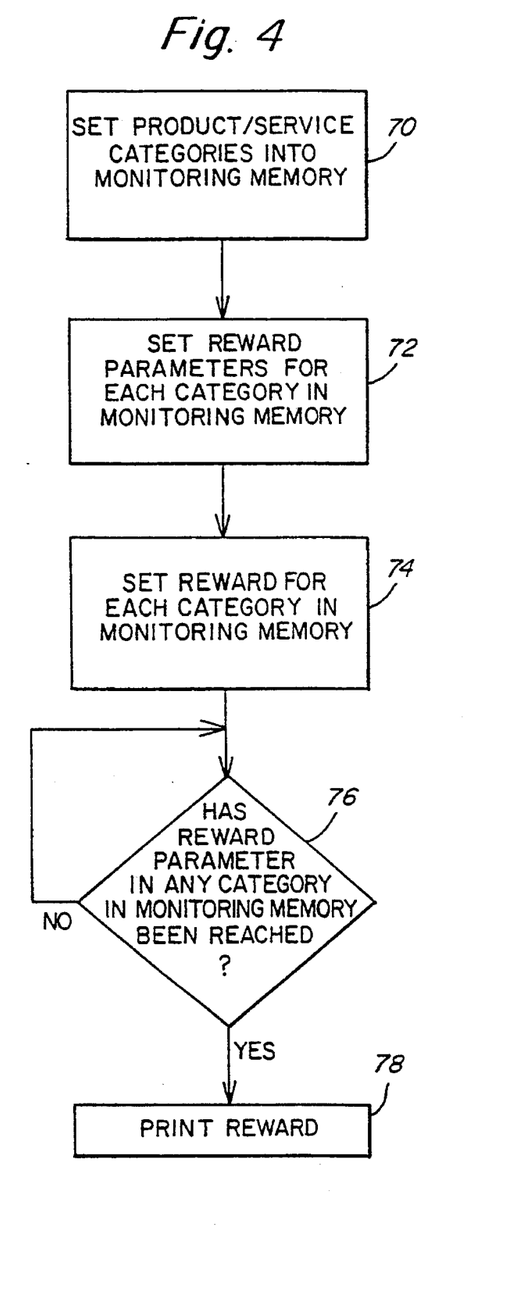
FIG. 4 is a flow chart depicting how CPU 55 in FIG. 3 is programmed to issue an instantaneous reward to the consumer.

The manner in which CPU 55 is programmed to carry out this operation is shown by the flowchart depicted in FIG. 4. Step 70 is carried out in response to signals from computer 4 provided to CPU 55 on line 63. The control signals from computer 4 are used by CPU 55 in step 70 to set the categories based on one or more codes respectively corresponding to purchased products and/or services. Each of these categories is assigned an area in monitoring memory 45. Of course, anyone skilled in the art knows that the mention of "area" is only a graphical way of picturing what is really occurring in monitoring memory 45. It is not necessary to actually have an area, as such. This merely refers to the assignment of addresses in memory which are associated with a particular category. In any case, when the categories are set into monitoring memory 45 in the manner described just above, CPU 55 proceeds in step 72 to set reward parameters for each of these categories. This is done also based on signals provided on line 63 from computer 4. Such a parameter can be, for example, the number of entries stored for each category. This number can, of course, vary from category to category. The reward parameter can also be time. In particular, a reward can be generated only if the purchase is recorded within a particular time from when the purchase was actually made, as is determinable from the time and data information stored on record 13.

Per step 74, CPU 55 also stores a specific reward for each category. Again, this is done based on signals received on line 63 from computer 4. The reward can be the same regardless of the identity of the consumer if it depends, for example, strictly on the number of entries stored in the category or the elapsed time, as explained above. On the other hand, the reward can also be targeted to particular individuals. Thus, if the reward is such as to be based on the personal code obtained from record 13 or reader 49, CPU 55 can determine whether the consumer is a male or a female from a profile of the consumer stored in CPU 55 and accessible with the personal code store on record 13 or entered with reader 51. The reward might be different for a male consumer than if a female is thusly identified. Decision box 76 represents steps carried out to determine whether the reward parameter set for any of the product/service categories has been reached. If one has not been reached, then a loop is established which repeats this test. If one has been reached, then step 78 controls printer 57 to print out the reward which corresponds to the particular category involved. Thus, this provides a powerful tool for instantly rewarding the consumer by virtue of providing the means in the home of the consumer which monitor, record, process, analyze and immediately respond to the data collected in monitoring memory 45 for generating a reward by virtue of printer 57. In addition, this technique provides the advertiser with the capability of targeting the reward based on the actual purchases that are made and/or to a particular consumer. Thus, a different reward will be generated if the consumer is purchasing soda beverages than if the purchased product is ice cream. Also, if a male consumer purchases ice cream, the reward might be a coupon for more ice cream. However, if a female purchases the ice cream, then the reward might be a coupon for ice cream dishes, for example.

Home unit 41 as depicted in FIG. 3 also makes it possible for the advertiser to increase the size of the consumer audience participating in the test while shortening the time required for obtaining meaningful results even with the larger audience. With prior art techniques, the use of a greater number of test participants would mean an increase in the amount of gathered data, and a commensurate delay in producing the test results and making them available to the advertiser. Of course, the advertiser who is undertaking major expenses on a daily basis wants to know as soon as possible what the impact of the campaign is so that modifications thereto can be made in order to maximize the "bang for the buck". Thus, on the one hand, the advertiser wants to increase the sample size in order to make the results as meaningful as possible while, on the other hand, the advertiser wants to get the results "yesterday" so that a waste of money on a less than helpful campaign can be avoided. This is not possible with the prior art. However, the present invention provides an excellent way of accomplishing these seemingly conflicting goals.

Figure 5:
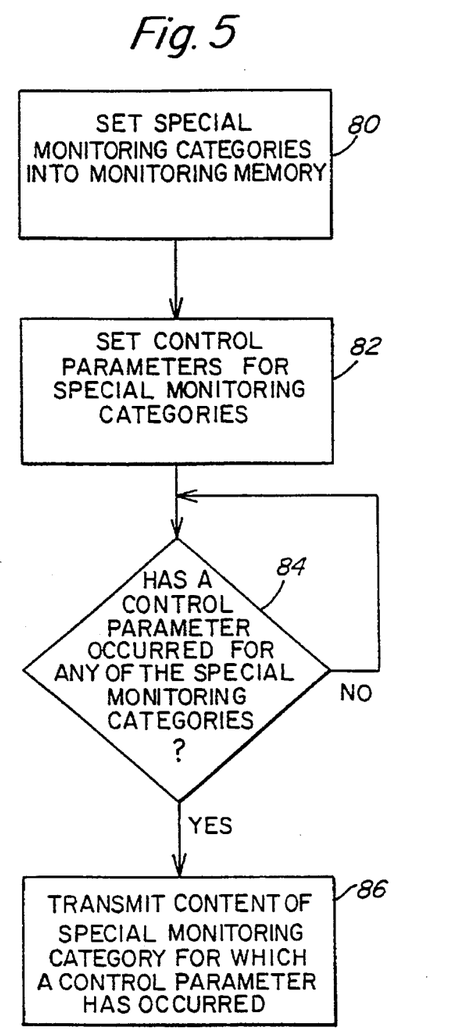
FIG. 5 is a flow chart depicting how CPU 55 in FIG. 3 is programmed to speed up the process of obtaining test results.

FIG. 5 shows how CPU 55 can be programmed to implement this technique. Specifically, based on signals from computer 4 provided on line 63, CPU 55 sets special categories into monitoring memory 45 much in the same way as this was done in FIG. 4. These special monitoring categories can be for both the monitoring of advertisements to which the consumer was exposed as well as to the monitoring of the consumer purchasing behavior. Thus, one category could be set for only television programs watched by the consumer, similar to Nielsen ratings, and/or monitoring of television commercials. Another category could be set for the purchase of a particular product or group of products. This setting of categories is represented in step 80. CPU 55 then sets control parameters for each of these special monitoring categories. This is represented by step 82 which is also carried out in accordance with signals from computer 4. The control parameter can be, for example, the receipt of a trigger signal from computer 4 on line 63. Another control parameter might be the occurrence of a pre-set number of items in a particular category. Thus, if the consumer has purchased five boxes of cereal on a particular shopping expedition, this occurrence can be detected by judicious setting of the control parameter so that the advertiser can identify every household which is a heavy user of cereals. Another control parameter might be time, so that a purchase made on a particular day of the week, for example, will be identified. In any case, decision box 84 senses whether such a control parameter has occurred. For example, it can be determined whether a triggering signal has been detected from computer 4. If so, then all of the categories associated with that trigger signal will be transmitted per step 86 to computer 4 for additional processing. This approach makes it possible to focus on only a certain limited portion of the total amount of data stored in monitoring memory 45. Thus, if an advertiser must have results very quickly, his product is separated into a special category and suitable control parameters are set. Then, only his data must be transmitted to computer 4, collected, processed, analyzed and output. This is a very valuable feature made available with the present invention. In addition, a large increase in the number of consumer test subjects is possible because only a limited portion of the data generated by all of them needs to be retrieved from monitoring memory 45 and processed in order to obtain the results of greatest immediate interest.

Although a preferred embodiment of the present invention has been disclosed in detail above, it will be apparent that various modifications thereto can readily be made. These and other such modifications are all intended to fall within the scope of the present invention as defined by the following claims.

I claim:

1. An apparatus for monitoring purchasing behavior of a consumer, comprising:

cash register means for use in a store to place purchase information related to purchases made in the store by the consumer on a machine-readable record;

a unit for use in a home of the consumer and having means for reading the purchase information on said machine-readable record and for storing data associated with said purchase information, said home unit including:

(a) means for detecting when a predetermined threshold has been reached of a selected category of said data stored in said data storing means, and (b) means coupled to said detecting means for issuing a reward to said consumer when said threshold is reached.

2. The apparatus of claim 1, wherein the selected category of said data is related to a number of purchased products of a predetermined type.

3. The apparatus of claim 1, wherein the selected category of said data is related to time which has elapsed from when a product was purchased.

4. The apparatus of claim 1, wherein the means for issuing a reward targets the reward based on a characteristic of the consumer.

5. The apparatus of claim 1, wherein the means for issuing a reward targets the reward based on a characteristic of what the consumer has purchased.

6. The apparatus of claim 1, wherein the purchase information is related to purchases subject to promotions.

* * * * *